E. CORTES.
Sugar-Cane Planter.
No. 60,620. Patented Dec. 18, 1866.
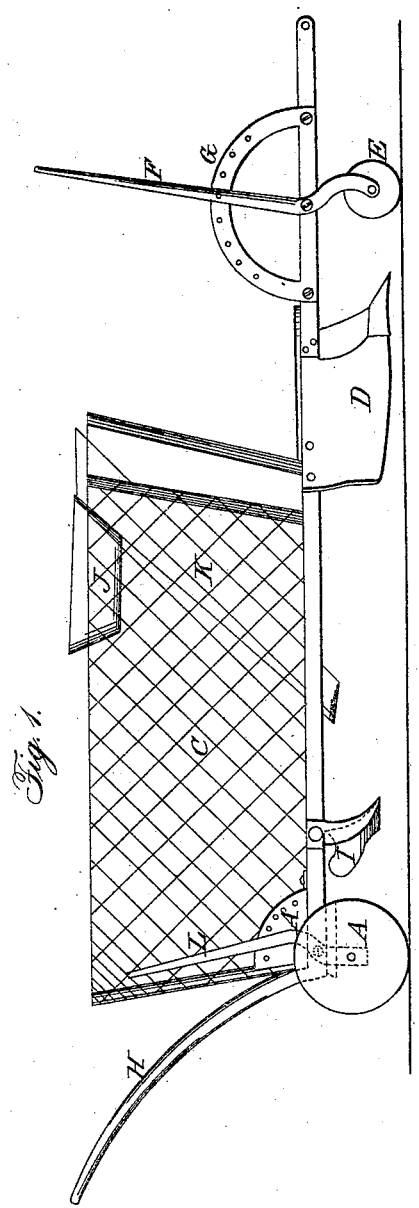
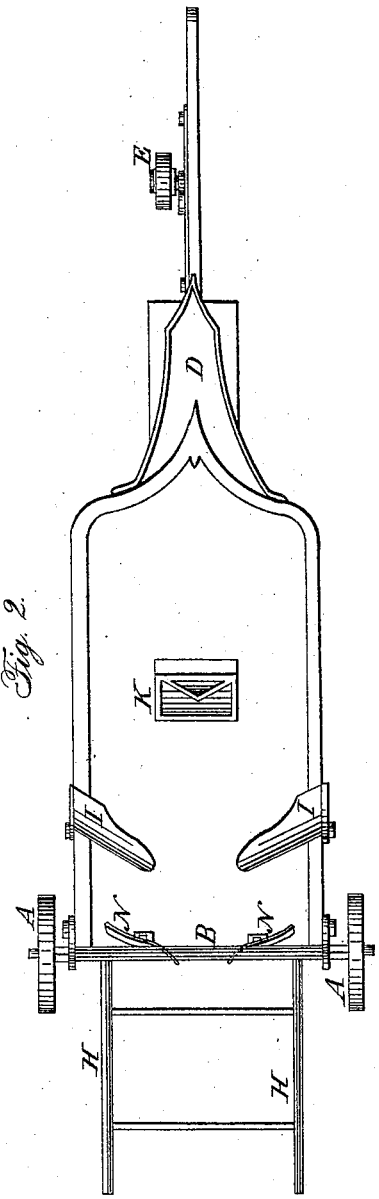
Witnesses:
F. A. Jackson
Theo. Tusch
Inventor:
E. Cortes
Per Munn & Co
Atty

United States Patent Office.

IMPROVEMENT IN SUGAR-CANE PLANTER.

EUSEBIO CORTES, OF SAGUA LA GRANDE, CUBA, ASSIGNOR TO JOSE A. MORA, OF NEW YORK CITY.

Letters Patent No. 60,620, dated December 18, 1866.

The Schedule referred to in these Letters Patent and making part of the same.

TO ALL WHOM IT MAY CONCERN:

Be it known that I, EUSEBIO CORTÉS, of Sagua la Grande, Isle de Cuba, have invented a new and useful improved Sugar-Cane Planter; and I do hereby declare that the following is a full, clear, and exact description thereof, which will enable others skilled in the art to make and use the same, reference being had to the accompanying drawing, forming part of this specification.

My invention relates to an improvement in a sugar-cane planter by which sugar-cane can be planted even and accurate, and at the same time covered, and the ground levelled, by the same machine. My invention more particularly consists in the peculiar construction and arrangements of levers in relation to the wheels for the purpose of gauging the depth of the ploughs and the profundity of the furrows.

Figure 1 is a side elevation of my improved cane-planter.

Figure 2 is a bottom plan view of the same.

Letters of like name and kind refer to like parts in each of the figures.

A A represent two wheels of common construction that run on an axle, B, upon which is mounted the rear end of the body or box, C, which is made of wire-cloth, with front end resting on the plough D and wheel E. This plough, D, is made of metal, with a double mould-board, and secured to the front end of the lower portion of the frame of the box C, which extends forward of the plough for the purposes of attaching the team. The wheel E is attached to the lower end of the lever F, which has a fulcrum on the front portion of the frame of the box C. The lever F extends up and may be moved and set at any desired angle, which elevates and lowers the wheel E, and gauges the depth of the plough D. The said lever may be secured in any desired position by passing a pin through the perforations of the lever and corresponding perforations in the quadrant G. H H are the handles by which the machine is guided, and are secured to the lower portion of the frame of the box C. I I are two ploughs secured to the bottom of the frame of the box. J is the hopper in which the cane is deposited from the box for the feeder. K is the chute or tube set at an angle of about fifty degrees, through which the cane is fed to the ground. The bottom of the said chute is triangular in form, so that the pieces of cane are deposited a short distance from each other. L is a lever pivoted to the bottom of the frame. In the lower ends of the said levers are bearings in which the axle runs. This lever is for the purpose of elevating and lowering the plough I I, and may be set and secured at any desired elevation by means of the said lever L. The operation is simple and perfect, and consists in attaching the team to the front end of the frame of the box C, and one man deposits the cane in the hopper or receiver, J, when another man feeds it down the chute K into the furrow made by the plough D, when it is immediately covered by the ploughs I I, and the ground is levelled by the followers N N. It will be observed that the ploughs may be elevated and lowered by means of the levers, according to the profundity of the furrows desired.

Having thus described my invention, what I claim as new, and desire to secure by Letters Patent, is—

1. The cane-planter, consisting of the wire-box C, plough D, ploughs I, hopper J, inclined chute K, handle H, and adjustable wheels A E, substantially as and for the purpose specified.

2. I also claim the lever F and wheel E, in combination with the frame A and plough D, when constructed and applied as herein shown and described.

The above specification of my invention signed by me this 30th day of June, 1866.

EUSEBIO CORTÉS.

Witnesses:
 THOMAS CLARKSON,
 GEORGE H. DIXON.